Aug. 7, 1934.                A. W. HARZ                1,969,129
                         CUTTING IMPLEMENT
                        Filed Jan. 13, 1934          2 Sheets-Sheet 1
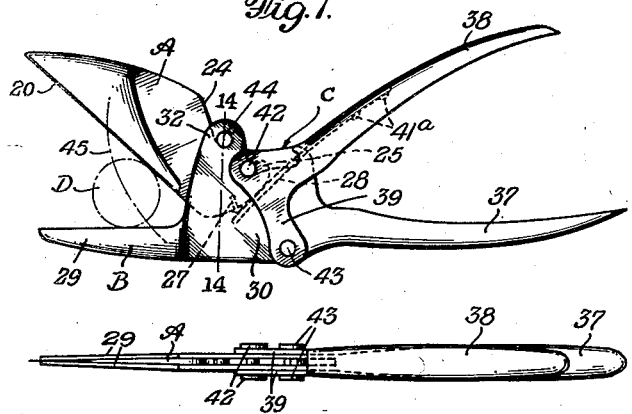
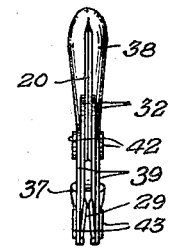
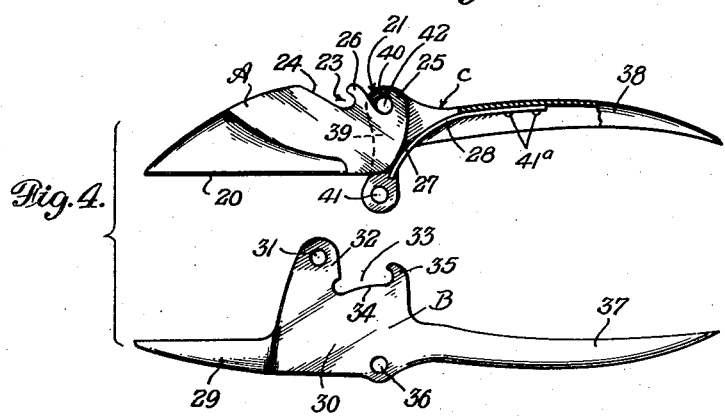
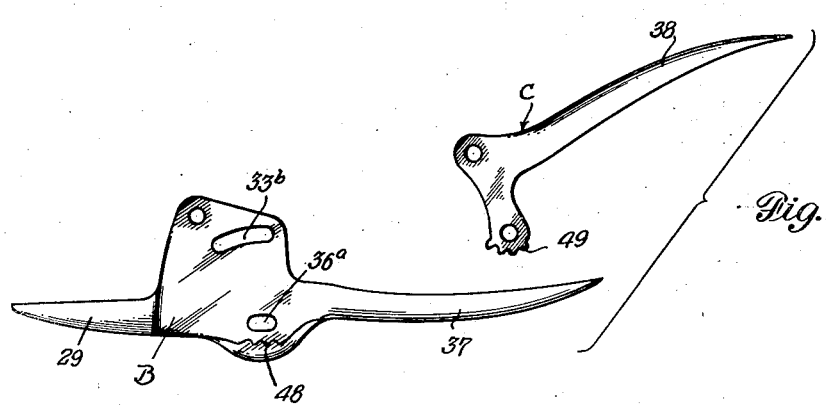
INVENTOR
A. W. Harz
BY Francis H. Templeton
ATTORNEY

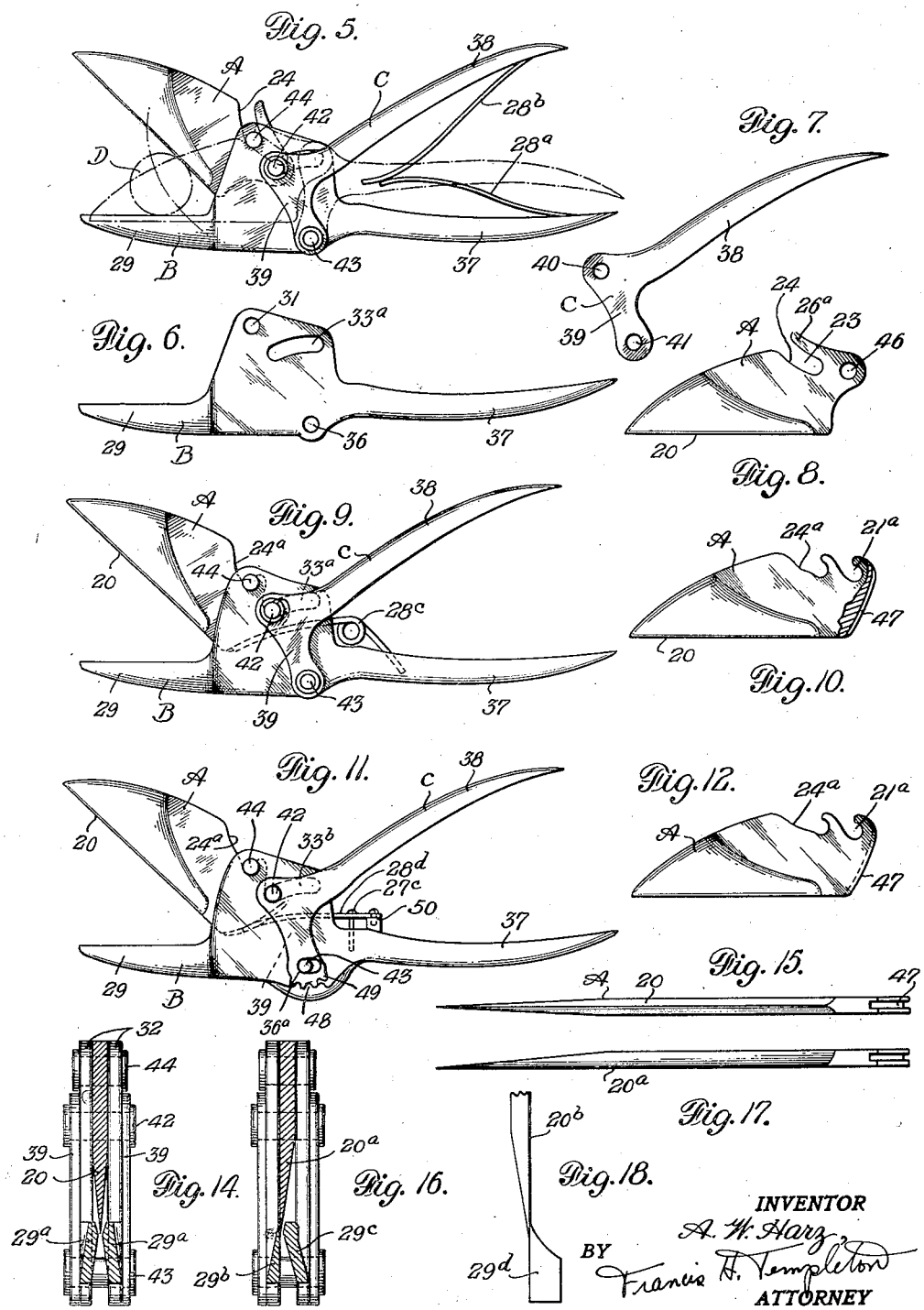

Patented Aug. 7, 1934

1,969,129

UNITED STATES PATENT OFFICE 1,969,129

CUTTING IMPLEMENT

Albert W. Harz, Tampa, Fla.

Application January 13, 1934, Serial No. 706,541

10 Claims. (Cl. 30—11)

The invention relates to cutting implements, and more particularly to pruning shears of the type in which the cutting blade has a drawing action in order to more easily separate the material being cut.

The primary object of the invention is to provide a cutting implement which will perform a cutting operation on a branch or twig with the least expenditure of energy and in such a manner as to produce a smooth cut which will readily heal. A further object of the invention is to provide a cutting implement which may be cheaply manufactured and easily assembled. A further object is to provide a pruning implement so constructed as not to become clogged with bark, wood, dirt or debris. A still further object is to provide a cutting implement in which the parts may be readily separated when necessary, for sharpening the blade or for cleaning purposes, or for replacement of a blade or other parts.

According to my invention the cutting implement preferably includes three separable parts, namely a relatively movable cutting blade, a relatively fixed jaw, preferably formed integral with a handle member, which fixed jaw is adapted to coact with the cutting blade in severing a branch, twig or the like, and a movable handle member or operating lever which is pivotally connected both to the cutting blade and to the relatively fixed jaw. The cutting blade and the fixed jaw are provided with coacting means for insuring a drawing cut when the operating handle is moved toward the fixed handle, while a spring or the like is provided for normally holding the handles and jaws in separated positions.

In the accompanying drawings illustrative embodiments of the various features of the invention are set forth in detail, but it will be apparent that the inventive thought is not to be considered as limited to such details.

In the drawings,

Fig. 1 is a side view of one form of the pruning implement, with the parts in assembled relation;

Fig. 2 is a top plan view of the same;

Fig. 3 is a front view;

Fig. 4 is an exploded view showing the cutting blade, operating lever and spring assembled but separated from the fixed jaw, which latter is shown in the lower part of the figure;

Fig. 5 is an assembly similar to Fig. 1, but showing a modification;

Figs. 6, 7 and 8 are details of the elements of Fig. 5, Fig. 6 showing the fixed jaw and handle integral therewith, Fig. 7 showing the operating lever which is identical with the operating lever of Figs. 1 and 4, and Fig. 8 showing the cutting blade;

Fig. 9 is an assembly view showing a further modification, the cutting blade being different from that included in Fig. 5, but the lever and fixed jaw being the same;

Fig. 10 is a detail showing the cutting blade of Fig. 9;

Fig. 11 is an assembly view showing a still further modification;

Fig. 12 is a detail showing the blade of Fig. 11;

Fig. 13 is an exploded view showing the operating lever and fixed jaw of the modification included in Fig. 11, both of these elements being provided with gear teeth;

Fig. 14 is an enlarged detail section such as may be taken on line 14—14 of Fig. 1, with the blades closed, showing the cooperative relation of the cutting blade with the fixed jaw;

Fig. 15 is a detail showing the cutting edge of the blade of Fig. 14;

Fig. 16 is a view similar to Fig. 14, but showing a modified form of cutting blade and a modification of the cooperating jaw;

Fig. 17 is a detail showing the blade of Fig. 16, and

Fig. 18 is a further modification showing a slightly different form of cutting blade and cooperating jaw.

The cutting implement preferably includes three separable members, namely (1) a movable cutting blade A, (2) a relatively fixed jaw B cooperating with the cutting blade A and preferably having a handle formed integral therewith, and (3) an operating lever or handle C. These three members are included in all of the modifications herein illustrated, with variations in detail of one or more of the individual members, such variations affecting to a greater or less degree the cooperative action.

The cutting blade A is best shown in Fig. 4 and includes a cutting edge 20. At the upper rear portion of the blade there is an open slot 21 adapted for cooperation with a pin carried by the operating lever C. The forward surface of the slot 21 slopes forwardly and upwardly. At 23 a second open slot is formed just in front of the slot 21 and is adapted for cooperation with a pin carried by the member B. The slot 23 has an upwardly and forwardly sloping cam surface 24. A forwardly and upwardly directed lug or projection 25 provides a rear abutment for the slot 21 and a similar projection 26 separates the slot 21 from the slot 23. An adjusting screw 27 may be provided at the rear of the blade A for cooperation with a suitable spring 28 attached to the operating lever C.

The member B includes a jaw proper 29 adapted to cooperate with the blade 20 in the cutting operation. The jaw 29 is preferably formed integral with a body portion 30 having an aperture 31 formed in an upstanding lug 32 and having an open slot 33 just in rear of the lug 32 provided with a cam surface 34 which terminates at a rear lug 35. An aperture 36 is provided in the lower portion of the body member 30 and substantially to rear of the aperture 31. The aperture 36 is located substantially beneath the rear end of the slot 33. Preferably a handle 37 is formed integral with the body portion 30 and jaw 29.

The operating handle or lever C is shown separately in Fig. 7. This lever includes a handle 38, a crank arm or lever 39 extending substantially at right angles to the handle 38 and provided with apertures 40 and 41 at opposite ends of the arm. The spring 28, previously described in connection with blade A, is secured at one end to the inside of handle 38 by suitable attaching means 41a, which may be made adjustable to provide variation in spring tension. At the upper portion of Fig. 4 the members A and C are shown in assembled position. A fulcrum 42 passing through the aperture 40 in the crank arm or lever 39 engages the blade member A at the rear of the slot 21. The spring 28 presses against the adjustable screw 27 and serves to retain the blade A and operating handle B in assembled position, the spring tending to force the blade A upwardly and forwardly to the position indicated in full lines in Fig. 1. It will be noted that the blade A can be removed at any time without the use of wrenches or other tools, by merely retracting the spring 28 and disengaging the blade from the pin 42.

The relatively movable members A and C may be assembled with the relatively fixed member B by inserting a fulcrum or pin 43 through the apertures 36 and 41 in the members B and C respectively. The pin 42, by means of which the members A and C are attached, is adapted to slide in the slot 33 in the member B along the cam surface 34 thereof, the ends of the slot being closed to retain the fulcrum pin in its end positions. A fulcrum pin 44 passes through the aperture 31 in the member B and fits in the slot 23 in the blade member A, being adapted to slide along the cam surface 24 in said slot as the parts are actuated, its rearward position being fixed by lug 26.

The operation of the device is best illustrated in Fig. 1. The parts are normally retained in the open position by means of the spring 28 which shoves the blade A forward and outward with the pins 42 and 44 engaging upstanding lugs 25 and 26 respectively and with the handle 38 of the operating lever raised.

To perform the cutting operation, the handle 38 of the movable operating member C is pressed toward the fixed handle 37, pivoting about the fulcrum 43. This movement of the operating member draws the blade A rearwardly by the engagement of the pin 42 with the lug 25 at the rear of the blade A. The pivot 42 rides rearwardly and upwardly along the inclined surface 34 until it reaches the upstanding lug 35, in which position the handles 37 and 38 are in proximity to each other and the blade A closed. The engagement of the pin 42 against the lug 25 on the blade member draws the blade rearwardly, and during such rearward movement the inclined surface 24 on the upper surface of the blade A engages the fixed pin 44 by reason of the pressure of spring 28 against blade A, thus forcing the blade toward the fixed jaw B to closed position. The movement of the blade in cutting a branch or twig D is indicated by the curved line 45 in Fig. 1. By the arrangement of parts herein set forth an increased leverage is insured, together with smoothness of operation throughout the cutting movement.

The shearing members are shown in Fig. 14, wherein the blade 20 is provided with a V-shaped cutting edge and fits between two fixed members 29a, 29a of the jaw 29. The blade is shown in detail in Fig. 15.

A slight modification of the shearing members is shown in Figs. 16 and 17, wherein the movable cutting blade 20a is shown as straight on one side and inclined on the other. The blade 20a coacts with a sharp jaw member 29b, which is straight on one side and inclined on the other, and with a second jaw member 29c similar to the members 29a. The sharp members 20a and 29b perform the actual cutting operation, the member 29c serving merely as a guard. The cutting blade 20a is shown in detail in Fig. 17.

In Fig. 18 the upper blade member 20b is shown as coacting with a single sharpened jaw member 29d. In this modification both members 20b and 29d constitute cutting blades.

A modification of the invention is illustrated in Figs. 5 to 8 inclusive. In this modification the member C is the same as in the form previously described. The blade member A is similar in form and operation, except that it is provided with an aperture 46 at the rear thereof, in place of the open slot 21. The slot 23 in the modification is bounded by a projection 26a which is longer than the lug 26 in the previously described modification and is intended to prevent the parts from slipping out of engagement, since there is no spring engaging the rear of the blade to hold the parts in assembled position. A pair of springs 28a and 28b, however, attached to the handles 37 and 38 respectively, serve to normally hold these members separated with the blade A forward and open. The member B in the modification is similar to the corresponding member previously described except that a closed slot 33a is employed in place of the open slot 33. To perform the cutting operation the handle 38 is moved toward the handle 37, thus drawing the blade member A rearwardly and downwardly to the dotted position, severing the branch or twig D. The slot 33a in the member B guides the pin 42 in its rearward movement, and the cam surface 24 slides along the pin 44 to force the blade toward the fixed jaw 29. The elongated projection 26a retains the pin 44 in the slot 23.

In the modification illustrated in Figs. 9 and 10, the members B and C are the same as in Fig. 5. The member A, however, has an open slot 21a similar to that shown in the first described embodiment of the invention, and is accordingly provided with a spring 28c having a portion engaging the blade member A at the rear thereof and tending to force the same forwardly, thus retaining the parts A and C in assembled position. In this embodiment of the invention the blade A is detachable. The cam surface 24a at the upper portion of the blade member differs from the cam surface 24 in the previously described embodiments in that it is provided with a compound curve and is intended to provide a more positive cutting action and smoother operation. The spring 28c is shown as coiled intermediate its ends, with one arm engaging in a slot 47 at the rear of the blade A and the other reacting against handle 37.

The embodiment of the invention shown in Fig. 11 is similar to that shown in Fig. 9, but is provided with positive inter-engaging means between the members B and C. The blade member A may be the same as in Fig. 9 and as shown is provided with a slot 47 at the rear thereof for engagement of a suitable spring 28d. The members B and C are provided with inter-engaging rack and pinion members 48 and 49 to insure positive operation, and on this account a slot 36a takes the place of the aperture 36 shown in the previous embodiments of the invention. This slot is most clearly shown in Figs. 11 and 13. The spring 28d is shown as flat, with the forward end engaging the slot at the rear of the blade and the other end secured as at 50 to the handle 37 of the member B. An adjusting screw 27c may be provided for varying the tension. This screw may be placed behind the member 50 instead of in front as shown.

Numerous embodiments of the invention have been described in detail for the purpose of illustration. It will be understood that the various forms of blade members may be employed with modified forms of the operating lever and jaw member, and vice versa. In each of the embodiments of the invention the blade member is adapted to be drawn rearwardly and toward the jaw member with a slicing cut. The fulcrums and cam surfaces of the cooperating members are so designed as to produce maximum power and the highest degree of efficiency in the cutting operation. The parts are so designed as to facilitate separation for cleaning or sharpening the blade, and the entire device is designed with a view to producing a pruning implement having a maximum efficiency consistent with relatively low manufacturing expense.

It will be understood that, while the invention has been described with particular reference to pruning shears, the invention in its broadest aspect is applicable to cutting implements intended for various purposes and is not to be limited to pruning shears.

The various illustrated embodiments of the invention may be further modified without departing from the spirit of the invention. For example, in the shear members illustrated in Figs. 8, 10 and 12, the shape, curves and angles of inclination of the cam surfaces 24, 24a may be modified so that the amount of the drawing cut may be varied as desired, or preferably so that there is less drawing cut as the blade enters and also as it leaves the object to be cut than there is at points nearer the center of the object to be cut, a branch for example.

In the embodiment of the invention shown in Figs. 11 and 12, the slot 47 may be omitted where a flat spring is used of a width substantially equal to the thickness of the rear end of the blade. The spring is held in position between the two members of the fixed jaw B.

In the forms of the device shown in Figs. 1, 12 and 14, it will be noted that the upper outside edge of the blade serves as a bearing surface for the fulcrum 44 and thus determines the direction of the draw cut and forces the blade downwardly as the operating lever is pushed downward. If desired, the pin 44 may be provided with a roller bearing to make the operation smoother.

In all of the herein illustrated embodiments of the invention it will be noted that the construction of the shears provides for an increasingly greater proportion of the blade to enter between the two upright lugs or guides 32 of the fixed jaw member B as the blade passes through the object to be cut, thus making for a truer and cleaner cut, through reinforcement of the blade by the blade guides. The invention also provides for triangular sharpening of the blades, thus allowing for a greater proportion of the blade to remain full thickness, making for greater rigidity, strength and accuracy of cut.

Reference has been made to the removal of the blade without the use of tools. The importance of this arises through the fact that two, three or more blades may be sharpened before the operator leaves for field work, and if one blade becomes dull another may be substituted at once, so that not even a file need be carried into the field. Loss of time in filing blades in the field is also avoided by this invention.

Although the invention is illustrated in connection with short handled shears, it is obviously equally adapted in principle for use in connection with the long handled variety. Other variations within the skill of the mechanic will suggest themselves to those familiar with the art to which this invention relates.

What I claim is:

1. In a cutting implement of the character described, a relatively fixed jaw member having a handle rigid therewith, a blade member, and operating means including a handle movable toward and from the aforesaid handle for simultaneously moving said blade longitudinally with reference to the jaw, and with a swinging movement toward or from the jaw according to the direction of movement of the operating means, said operating means including a crank arm extending at an angle to the handle portion thereof, said crank arm having a pivot at one end connecting it to the lower portion of the jaw member, and another pivot at its other end connecting it to the blade member, said blade member having an open slot inclined upwardly and forwardly and the jaw member having a projection slidable in said open slot, and a slot in said jaw member in which the pivot connecting the blade and crank arm is adapted to slide as the operating handle is swung about the pivot connecting it with the jaw member, said slot being open, and spring means yieldingly engaging the blade member at the rear thereof and tending both to hold the blade normally in forward and open position and to retain the blade and handle member in assembled position.

2. In a cutting implement of the character described, the combination of a jaw provided with a handle, a second jaw having a sliding pivotal engagement therewith, said second jaw having an open-ended slot, one of said jaws being sharpened, and an operating lever having a transverse member entering said slot.

3. In a cutting implement of the character described, the combination of a jaw having an open-ended slot, an operating lever having a transverse member entering said slot, and a spring holding the transverse member in the slot.

4. In a cutting implement of the character described, the combination of a jaw provided with a handle and a transversely extending member, a second jaw having a cam in an open slot on its back engaging said member, one of said jaws having a sharpened edge, and means for drawing the jaw having the cam across the transverse member.

5. In a cutting implement of the character described, the combination of a jaw provided with a handle and a transversely extending member, a second jaw having a cam on its back and a projection at the end of the cam, both the cam and projection engaging the said member, one of said jaws being sharpened, and means for drawing the jaw having the cam across said transverse member.

6. The combination of a jaw having a handle, a second jaw having a sliding pivotal engagement therewith, and an operating lever pivoted to the last-named jaw and carrying a sector of a gear, the handled jaw carrying a rack in engagement with said sector.

7. In a cutting implement of the character described, the combination of a jaw provided with a handle, a second jaw having a sliding pivotal engagement therewith, with an operating lever fulcrumed on the first-named jaw and connected with the sliding jaw, the handled jaw having a guiding surface, a transverse member on the lever engaging the guiding surface, and stops at each end of the guiding surface to limit the relative movement of the lever and handled jaw.

8. In a cutting implement of the character described, the combination of a jaw provided with a handle and a transversely extending member, a second jaw having a cam, which forms a portion of the outer edge of said second jaw and which engages the said member, one of said jaws being sharpened, and means for drawing the jaw having the cam across said transverse member.

9. A cutting implement as set forth in claim 8, wherein a spring engages the rear edge of the blade.

10. In a cutting implement of the character described, the combination of a jaw member provided with a handle, a second jaw having a sliding pivotal engagement therewith, with an operating lever fulcrumed on the first-named jaw member, and connected with the sliding jaw by means of a transverse member, the handled jaw member being provided with stops to limit the relative movement of the lever and handled jaw member, and the second jaw having a cam which forms a portion of the outer edge of said second jaw and which engages said transverse member.

ALBERT W. HARZ.